US008524077B2

(12) United States Patent
Ogawa (10) Patent No.: US 8,524,077 B2
(45) Date of Patent: Sep. 3, 2013

(54) SHOWER TUBE CLEANING DEVICE FOR FILTER FOR WATER TANK

(76) Inventor: Soichi Ogawa, Tokyo (JP)

( * ) Notice: Subject to any disclaimer, the term of this patent is extended or adjusted under 35 U.S.C. 154(b) by 258 days.

(21) Appl. No.: 12/991,072

(22) PCT Filed: Jul. 14, 2009

(86) PCT No.: PCT/JP2009/062704
§ 371 (c)(1),
(2), (4) Date: Nov. 4, 2010

(87) PCT Pub. No.: WO2010/007973
PCT Pub. Date: Jan. 21, 2010

(65) Prior Publication Data
US 2011/0099734 A1 May 5, 2011

(30) Foreign Application Priority Data

Jul. 16, 2008 (JP) ................................. 2008-184849

(51) Int. Cl.
*A01K 63/04* (2006.01)
(52) U.S. Cl.
USPC ....... 210/167.21; 210/232; 210/413; 119/259
(58) Field of Classification Search
USPC .................. 210/167.21, 167.22, 167.26, 232, 210/407, 413; 119/259
See application file for complete search history.

(56) References Cited

U.S. PATENT DOCUMENTS

| 5,558,042 A * | 9/1996 | Bradley et al. ................ 119/226 |
| 6,123,841 A | 9/2000 | Gotoh | |
| 2004/0154115 A1 * | 8/2004 | Schultz ........................ 15/104.2 |

FOREIGN PATENT DOCUMENTS

| JP | 3045478 B2 | 5/2000 |
| JP | 2004057071 A | 2/2004 |
| JP | 2004-243257 A | 9/2004 |
| JP | 2008-12470 A | 1/2008 |
| TW | 235407 | 12/1994 |

OTHER PUBLICATIONS

Notice of Allowance.

* cited by examiner

*Primary Examiner* — Fred Prince
(74) *Attorney, Agent, or Firm* — Arent Fox LLP (57) ABSTRACT

A shower tube cleaning device for a filter for a water tank in which clean water from the filter is returned to the interior of the water tank through the shower tube, which is provided with a plurality of nozzles, wherein an operating rod (11) passing through the interior of the shower tube (5) is linked to a cleaner (10) slidably provided within the shower tube (5), a knob (12) is fixed to the free end of the operating rod (11), and pushing and pulling the knob (12) makes the cleaner (10) reciprocatingly slide to thus scrape off foreign matter within the shower tube (5). This enables an inner face of the shower tube to be cleaned while the shower tube is linked to the filter.

8 Claims, 6 Drawing Sheets

SHOWER TUBE CLEANING DEVICE FOR FILTER FOR WATER TANK

TECHNICAL FIELD

The present invention relates to a shower tube cleaning device that is connected to a filter installed in a water tank for breeding aquarium fish, the filter filtering uncleaned water within the water tank.

BACKGROUND ART

Conventionally, within a water tank for breeding aquarium fish such as goldfish, tropical fish, or marine fish, with regard to a filter for filtering uncleaned water within the water tank, in which clean water from the filter is returned to the interior of the water tank through a shower tube, a cleaning device that cleans the interior of the shower tube by sliding a cleaning brush provided within the shower tube is known (ref. Patent Document 1 below).

Patent Document 1: Japanese Patent Application Laid-open No. 2004-243257

DISCLOSURE OF INVENTION

Problems to be Solved by the Invention

However, since in the arrangement of Patent Document 1 above a cleaning brush 55 is slidably provided in the interior of a shower tube 21 and a slider 56 is slidably provided on the exterior thereof, they are linked by left and right operating cables 59 and 60 provided outside the shower tube 21, and an inner face of the shower tube 21 is brushed and cleaned by the cleaning brush 55 being made to reciprocatingly slide via the left and right operating cables 59 and 60 as a result of the slider 56 being made to reciprocatingly slide in left and right directions, this conventional cleaning device cannot be employed for a shower tube whose base end is connected to a discharge port of a filter and whose extremity is closed by an end wall, and the overall structure is complicated and results in high cost; furthermore, smooth operation of the operating cables, which are provided outside the shower tube, might be prevented or they might be cut, thus giving rise to the problems of poor durability and reliability.

The present invention has been accomplished in the light of such circumstances, and it is an object thereof to provide a novel shower tube cleaning device for a filter for a water tank that solves the above-mentioned problems.

Means for Solving the Problems

In order to attain the above object, according to a first aspect of the present invention, there is provided a shower tube cleaning device for a filter for a water tank in which uncleaned water within a water tank is sucked into the interior of a filter, and clean water that has been filtered by the filter is returned to the interior of the water tank through a shower tube connected to a discharge port of the filter, wherein the cleaning device comprises a cleaner slidably provided within the shower tube, the base end of the shower tube being connected to the discharge port and the extremity thereof being blocked by an end wall, an operating rod that has one end linked to the cleaner, extends through the interior of the shower tube, and has a free end projecting outward through the end wall of the shower tube, and a knob fixed to the free end of the operating rod, foreign matter attached to the interior of the shower tube being scraped off by reciprocating sliding of the cleaner.

In order to attain the above object, according to a second aspect, in addition to the first aspect, the cleaner is formed from a cylindrical body, and the internal diameter thereof is substantially equal to the internal diameter of a joint tube connecting the discharge port of the filter to the shower tube.

In order to attain the above object, according to a third aspect, in addition to the first or second aspect, the operating rod linked to the cleaner passes on the central axis within the shower tube, extends through the end wall of the shower tube, and is linked to the knob, and a seal is provided between the knob and the end wall so as to water-tightly seal therebetween.

Effects of the Invention

In accordance with each aspect of the present invention, a shower tube inner face can be cleaned merely by repeated pushing and pulling of the knob while the shower tube remains linked to the filter. Since the cleaning device has a simple structure in which it is formed from the cleaner, the operating rod, and the knob at a low cost, and there are no movable parts on the outer periphery of the shower tube, the durability and reliability are excellent.

Furthermore, in accordance with the second aspect of the present invention, since the cleaner and the joint tube have substantially equal internal diameters, it is possible to reduce the resistance to the flow of water flowing through the shower tube.

Moreover, in accordance with the third aspect of the present invention, since the seal for giving a water-tight seal between the knob and the end wall of the shower tube is provided therebetween, there is no water leakage from the shower tube.

EXPLANATION OF REFERENCE NUMERALS AND SYMBOLS

4 Discharge port
5 Shower tube
7 Joint tube
8 End wall
10 Cleaner
11 Operating rod
12 Knob
F Filter
S Seal
V Water tank

BEST MODE FOR CARRYING OUT THE INVENTION

A mode for carrying out the present invention is explained below by reference to an embodiment of the present invention shown in the attached drawings.

Embodiment 1

Figure 1:
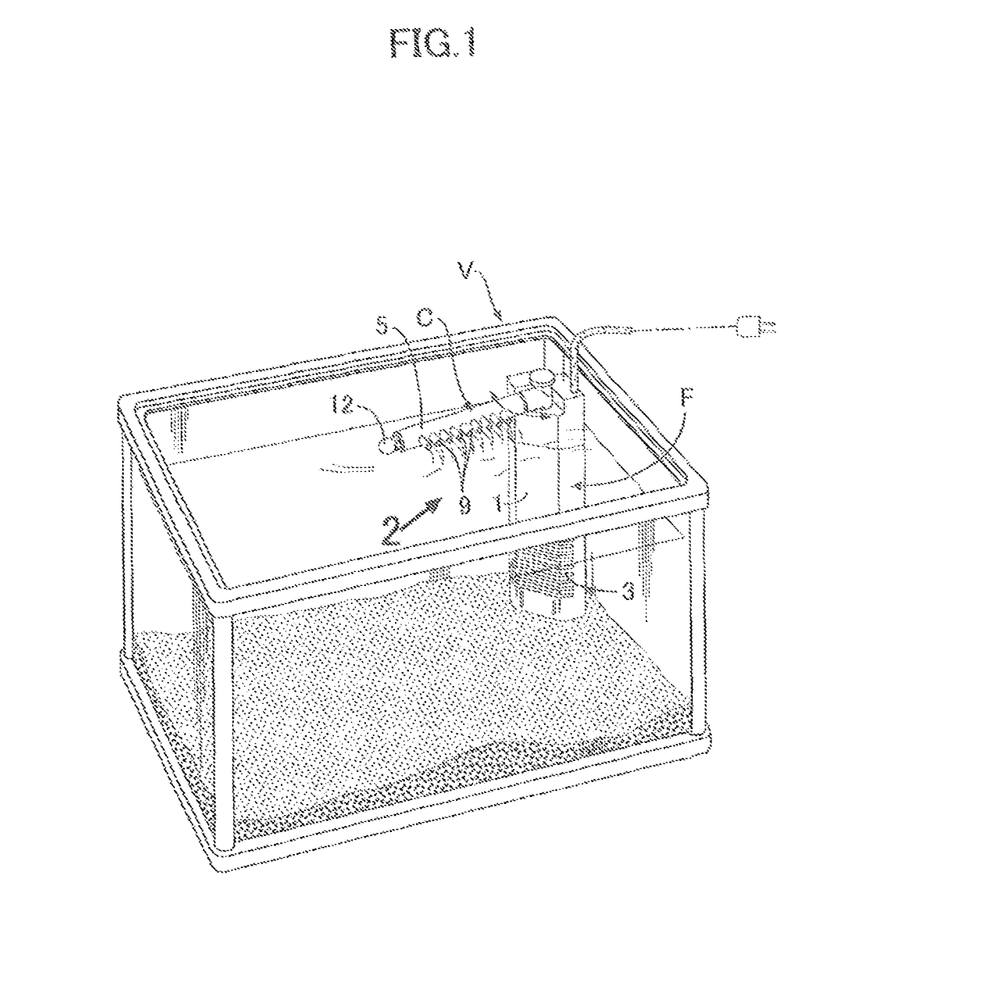
FIG. 1 is a perspective view showing a state in which a filter equipped with the shower tube cleaning device of the present invention is set within a water tank. (first embodiment)
Figure 2:
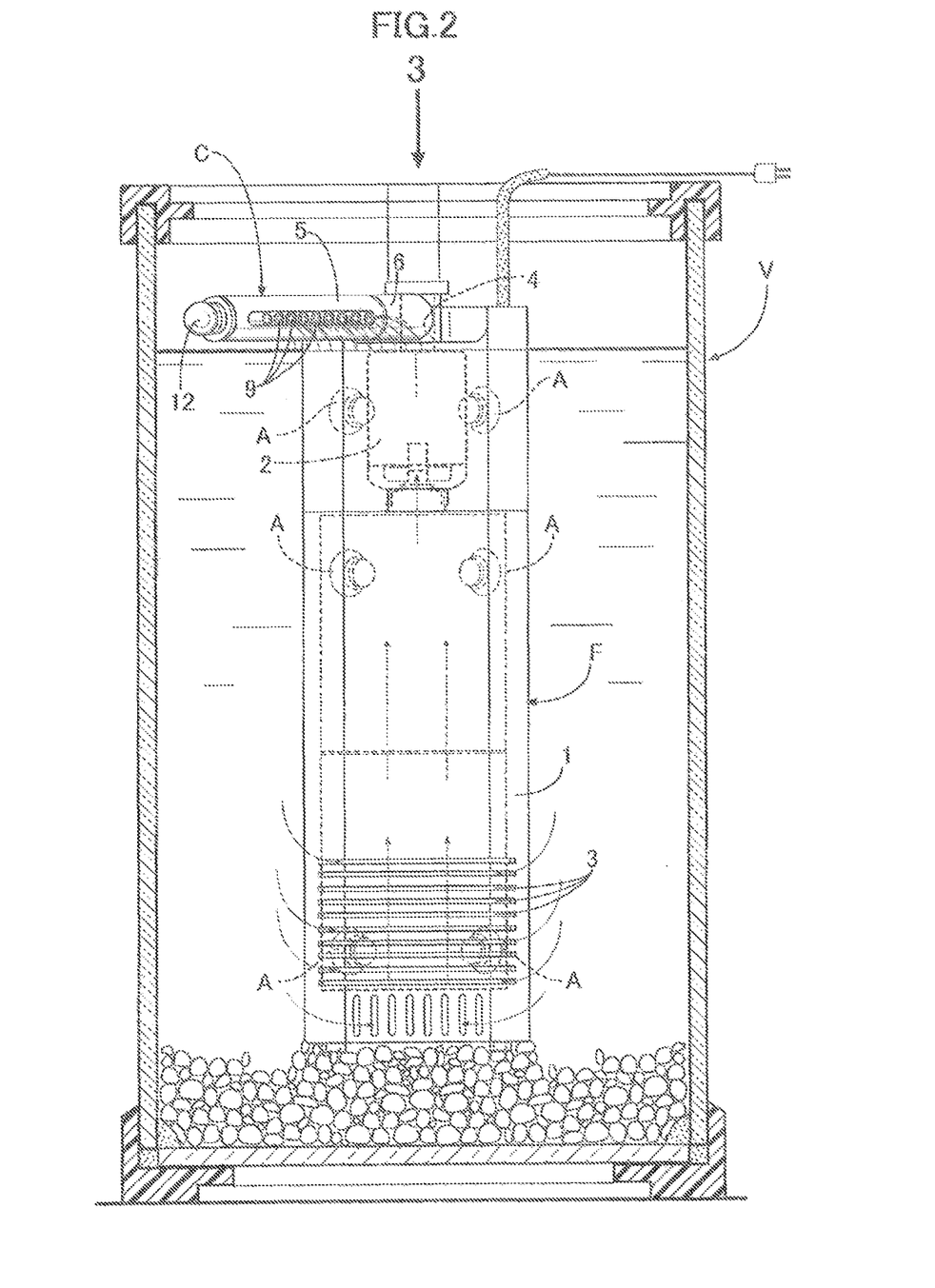
FIG. 2 is an enlarged view from arrow 2 in FIG. 1. (first embodiment)
Figure 3:
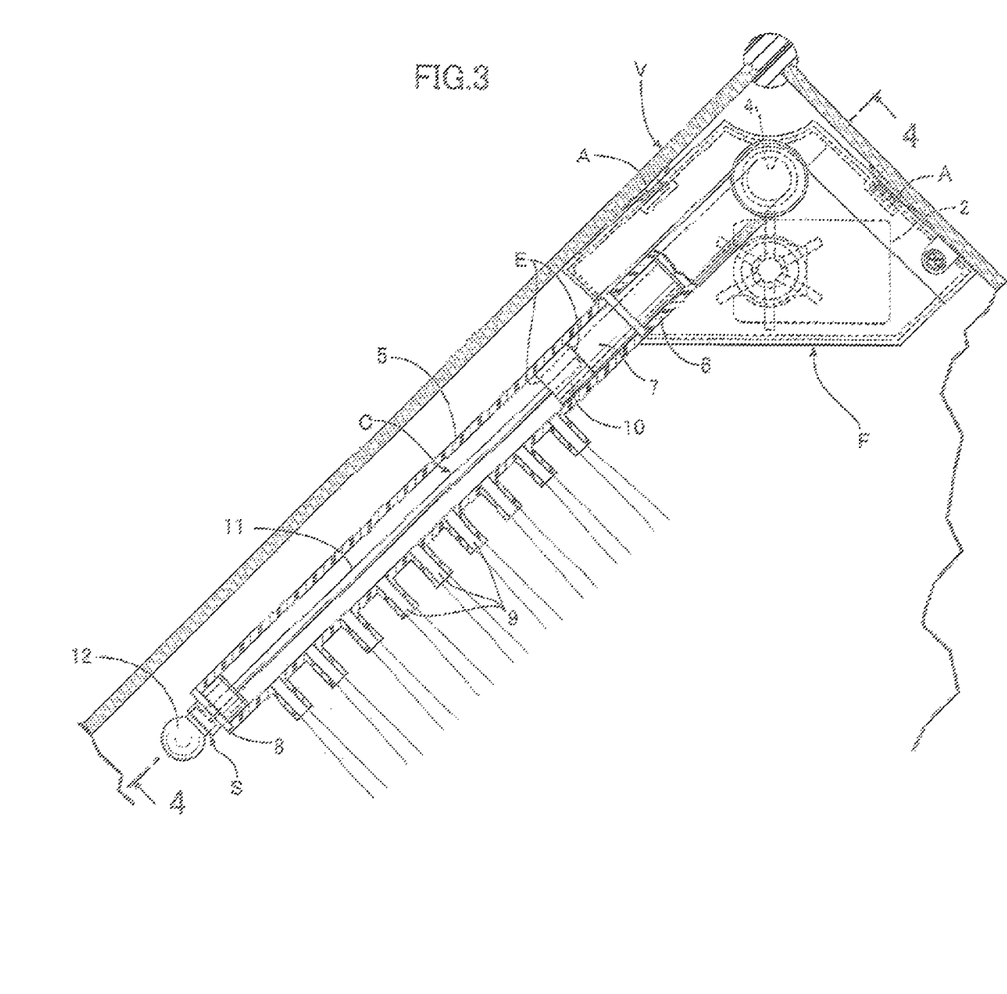
FIG. 3 is a view from arrow 3 in FIG. 2. (first embodiment)

First, referring to FIGS. 1 to 3, a filter F provided in a cleaning device related to the present invention is explained; this filter F basically has the same structure as a conventional structure, includes a filtration case 1 formed into a triangular tube shape that is long in the vertical direction with a triangular cross-section and divided into two, has a submersible pump 2 provided in an upper part, and is detachably mounted on a corner part within a water tank V by means of a suction cup A. The lower part of the filter F is provided with a suction inlet 3 communicating with the suction side of the submersible pump 2 and opening within the water tank V, the upper part thereof is provided with a discharge port 4 communicating with the discharge side of the submersible pump 2, the discharge port 4 has a drain tube 6 connected thereto so that it can pivot around the vertical axis, and this drain tube 6 has a shower tube 5 detachably connected thereto via a joint tube 7. A filter material is housed within a filtration chamber of the filtration case 1. In accordance with driving of the submersible pump 2, uncleaned water within the water tank V enters the interior of the filter F via the suction inlet 3, is filtered while passing through the filter material, and is then returned via the discharge port 4 to the interior of the water tank V through the shower tube 5.

Figure 4:
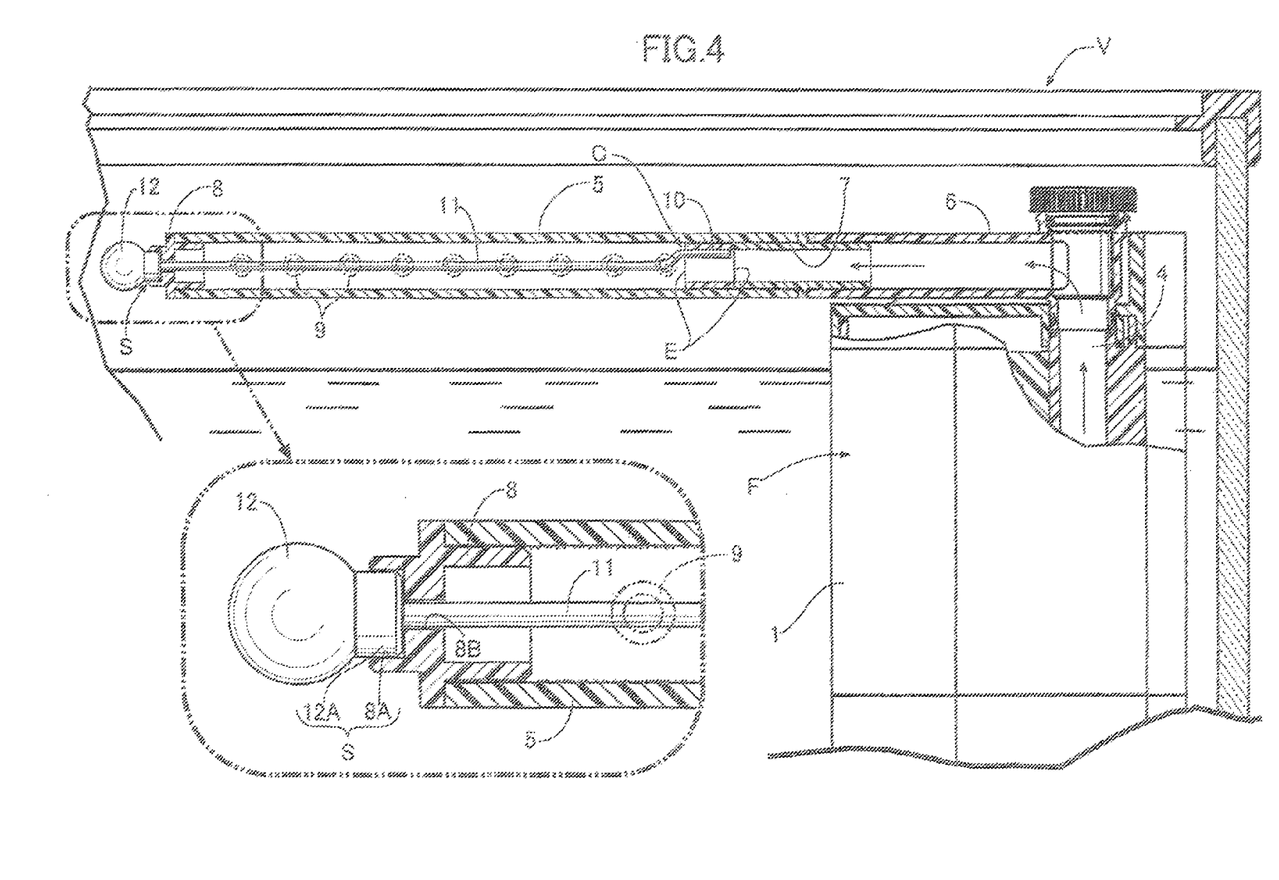
FIG. 4 is a sectional view along line 4-4 in FIG. 3. (first embodiment)
Figure 5:
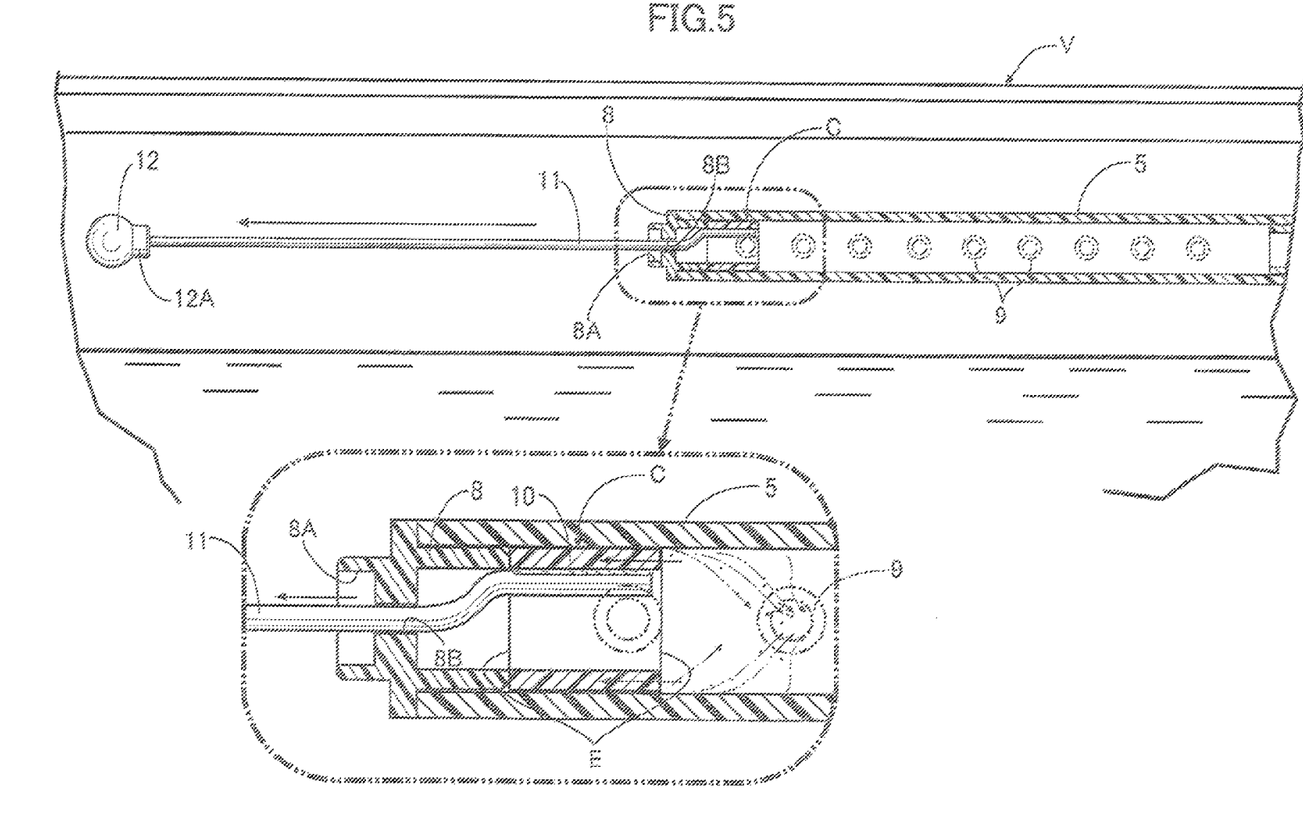
FIG. 5 is a sectional view, corresponding to FIG. 4, in a state in which the cleaning device is pulled. (first embodiment)

The structure of the cleaning device for a shower tube related to the present invention is now explained by reference to FIGS. 4 and 5 in addition to FIGS. 1 to 3.

The shower tube 5 is formed from a transparent rigid synthetic resin material into a hollow cylindrical shape, its base end is opened and detachably linked to the drain tube 6 via the joint tube 7, and its extremity is closed by an end wall 8. As is most clearly shown in FIG. 3, the shower tube 5 has a plurality of nozzles 9 communicating with the interior of the shower tube 5 and arranged in line along the lengthwise direction at substantially equal intervals, and ends of these nozzles 9 connected to the shower tube 5 are perpendicular to an inner face of the shower tube 5. A cleaner 10 is reciprocatingly slidably fitted within the shower tube 5. This cleaner 10 is formed from a rigid synthetic resin material into a hollow short cylindrical shape, its opposite end faces are perpendicular to its outer peripheral face, and edges E for scraping off foreign matter are formed at the peripheral edges thereof, the edges E having a right-angled cross-section. The internal diameter of the cleaner 10 is substantially equal to the internal diameter of the joint tube 7 so that water flowing through the drain tube 6 flows into the shower tube 5 with little resistance.

One end of an operating rod 11 is fixed to an inner face of the cleaner 10. This operating rod 11 is bent at the fixed end and extends in a straight line so as to run along the center line within the shower tube 5; its free end extends through a central hole 8B of the end wall 8 and further extends outward from the shower tube 5, and a spherical knob 12 is fixed thereto. When this knob 12 is pressed toward the shower tube 5, as shown in FIGS. 3 and 5, the operating rod 11 moves inward along the center line within the shower tube 5 to thus make the cleaner 10 slide inward and, furthermore, when it is pulled away from the shower tube 5, as shown in FIG. 5, it moves outward along the center line within the shower tube 5 to thus make the cleaner 10 slide outward, and an annular recess 8A is formed at the outer end of the end wall 8, whereas an annular projection 12A is formed at the inner end of the knob 12, the projection 12A being capable of being water-tightly fitted into the recess 8A, and as shown in FIG. 4 when the cleaner 10 is pushed most inward, that is, when a cleaning device C is stored, the projection 12A is water-tightly fitted into the recess 8A so that water within the shower tube 5 does not leak outward, the recess 8A and the projection 12A thus forming a seal S.

The operation of the cleaning device C is now explained by reference to FIG. 6.

Figure 6:
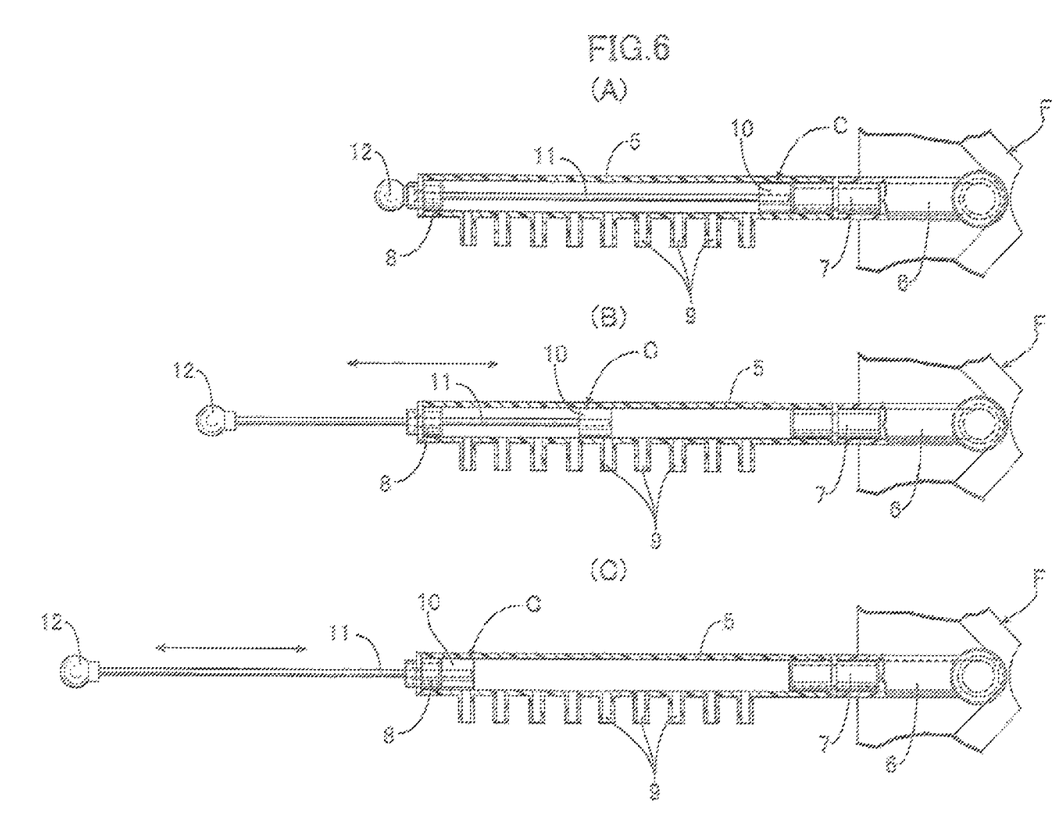
FIG. 6 is a view showing the operation of the cleaning device. (first embodiment)

When the filter F is in normal use, as shown in FIG. 6 (A), the knob 12 is water-tightly fitted into the extremity of the shower tube 5 and the cleaning device C is stored within the shower tube 5. When the filter F is operated by driving of the submersible pump, clean water filtered by the filter F enters the shower tube 5 from the drain tube 6 through the joint tube 7 and is squirted into the interior of the water tank V through the plurality of nozzles 9. In this process, pivoting the drain tube 6 or pivoting the shower tube 5 itself around the joint tube 7 enables the positions of spouts of the nozzles 9 to be changed.

When, as a result of continuous operation of the filter F, foreign matter such as moss, algae, or debris contaminating water flowing through the shower tube 5 or moss or algae propagated in the interior of the shower tube 5 due to it being transparent gradually becomes deposited and accumulates in the interior of the shower tube 5, thus preventing smooth squirting from the plurality of nozzles 9, or the above foreign matter has stained the shower tube 5, as shown in FIGS. 6 (B) and (C), the knob 12 is gripped and the cleaning device C is repeatedly pushed into and pulled from the shower tube 5, the cleaner 10 thereby reciprocatingly slides within the shower tube 5, and the edges E thereof can scrape off and remove the foreign matter deposited and accumulated on the inner face of the shower tube 5. Foreign matter thus scraped off and atomized is discharged outward through the nozzles 9.

After the above-mentioned cleaning operations are completed, the cleaning device C is returned to the stored position shown in FIG. 6 (A).

An embodiment of the present invention is explained above, but the present invention is not limited to the embodiment, and various embodiments are possible within the scope of the present invention.

For example, in the above embodiment, a case in which the present invention is applied to an internal filter mounted in a corner within a water tank is explained, but the present invention can of course be applied to another filter.

The invention claimed is:

1. A shower tube cleaning device for a filter for a water tank in which uncleaned water within a water tank is sucked into the interior of a filter, and clean water that has been filtered by the filter is returned to the interior of the water tank through a shower tube connected to a discharge port of the filter, wherein the cleaning device comprises a cleaner slidably provided within the shower tube, the base end of the shower tube'being connected to the discharge port and the extremity thereof being blocked by an end wall, an operating rod that has one end linked to the cleaner, extends through the interior of the shower tube, and has a free end projecting outward through the end wall of the shower tube, and a knob fixed to the free end of the operating rod, foreign matter attached to the interior of the shower tube being scraped off by reciprocating sliding of the cleaner.

2. The shower tube cleaning device for a filter for a water tank according to claim 1, wherein the cleaner is formed from a cylindrical body, and the internal diameter thereof is substantially equal to the internal diameter of a joint tube connecting the discharge port of the filter to the shower tube.

3. The shower tube cleaning device for a filter for a water tank according to claim 1 or 2, wherein the operating rod linked to the cleaner passes on the central axis within the shower tube, extends through the end wall of the shower tube, and is linked to the knob, and a seal is provided between the knob and the end wall so as to water-tightly seal therebetween.

4. The shower tube cleaning device for a filter for a water tank according to claim 1, wherein the cleaner comprises edges having a right angle cross-section, the edges being configured to scrape off the foreign matter attached to the interior of the shower tube.

5. The shower tube cleaning device for a filter for a water tank according to claim 1, wherein the shower tube is coupled to the discharge port via a drain tube, and the shower tube and the drain tube are coupled together by having respective open end portions thereof opposite one another.

6. The shower tube cleaning device for a filter for a water tank according to claim 5, wherein the drain tube is pivotable around a vertical axis.

7. The shower tube cleaning device for a filter for a water tank according to claim 5, wherein the shower tube is coupled to the drain tube via a joint tube.

8. The shower tube cleaning device for a filter for a water tank according to claim 7, wherein the shower tube is pivotable around the joint tube.

* * * * *

UNITED STATES PATENT AND TRADEMARK OFFICE
CERTIFICATE OF CORRECTION

PATENT NO.       : 8,524,077 B2
APPLICATION NO.  : 12/991072
DATED            : September 3, 2013
INVENTOR(S)      : Soichi Ogawa It is certified that error appears in the above-identified patent and that said Letters Patent is hereby corrected as shown below:

Title page should be deleted and substitute therefor the attached title page as shown.

Six (6) figures are hereby attached to provide further clarity.

Signed and Sealed this
Eighteenth Day of February, 2014

Michelle K. Lee
*Deputy Director of the United States Patent and Trademark Office*

(12) United States Patent
Ogawa (10) Patent No.: US 8,524,077 B2
(45) Date of Patent: Sep. 3, 2013

(54) SHOWER TUBE CLEANING DEVICE FOR FILTER FOR WATER TANK

(76) Inventor: Soichi Ogawa, Tokyo (JP)

(*) Notice: Subject to any disclaimer, the term of this patent is extended or adjusted under 35 U.S.C. 154(b) by 258 days.

(21) Appl. No.: 12/991,072

(22) PCT Filed: Jul. 14, 2009

(86) PCT No.: PCT/JP2009/062704
§ 371 (c)(1),
(2), (4) Date: Nov. 4, 2010

(87) PCT Pub. No.: WO2010/007973
PCT Pub. Date: Jan. 21, 2010

(65) Prior Publication Data
US 2011/0099734 A1    May 5, 2011

(30) Foreign Application Priority Data
Jul. 16, 2008  (JP) .................. 2008-184849

(51) Int. Cl.
*A01K 63/04* (2006.01)
(52) U.S. Cl.
USPC ....... 210/167.21; 210/232; 210/413; 119/259
(58) Field of Classification Search
USPC ............... 210/167.21, 167.22, 167.26, 232, 210/407, 413; 119/259
See application file for complete search history.

(56) References Cited

U.S. PATENT DOCUMENTS
| | | | |
|---|---|---|---|
| 5,558,042 A * | 9/1996 | Bradley et al. | 119/226 |
| 6,123,841 A | 9/2000 | Gotoh | |
| 2004/0154115 A1 * | 8/2004 | Schultz | 15/104.2 |

FOREIGN PATENT DOCUMENTS
| | | |
|---|---|---|
| JP | 3045478 B2 | 5/2000 |
| JP | 2004057071 A | 2/2004 |
| JP | 2004-243257 A | 9/2004 |
| JP | 2008-12470 A | 1/2008 |
| TW | 235407 | 12/1994 |

OTHER PUBLICATIONS

Notice of Allowance.

* cited by examiner

*Primary Examiner* — Fred Prince
(74) *Attorney, Agent, or Firm* — Arent Fox LLP

(57) ABSTRACT

A shower tube cleaning device for a filter for a water tank in which clean water from the filter is returned to the interior of the water tank through the shower tube, which is provided with a plurality of nozzles, wherein an operating rod (11) passing through the interior of the shower tube (5) is linked to a cleaner (10) slidably provided within the shower tube (5), a knob (12) is fixed to the free end of the operating rod (11), and pushing and pulling the knob (12) makes the cleaner (10) reciprocatingly slide to thus scrape off foreign matter within the shower tube (5). This enables an inner face of the shower tube to be cleaned while the shower tube is linked to the filter.

8 Claims, 6 Drawing Sheets

UNITED STATES PATENT AND TRADEMARK OFFICE
CERTIFICATE OF CORRECTION

PATENT NO.        : 8,524,077 B2                                              Page 1 of 1
APPLICATION NO. : 12/991072
DATED             : September 3, 2013
INVENTOR(S)       : Soichi Ogawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 256 days.

Signed and Sealed this

Fifteenth Day of September, 2015

Michelle K. Lee
*Director of the United States Patent and Trademark Office*